United States Patent [19]

Zeilinger et al.

[11] Patent Number: 5,110,240

[45] Date of Patent: May 5, 1992

[54] APPARATUS FOR COUPLING TOOL HOLDERS

[75] Inventors: James G. Zeilinger; Leon O. Kern, both of Frankenmuth, Mich.

[73] Assignee: DeVlieg-Bullard, Inc., Frankenmuth, Mich.

[21] Appl. No.: 697,583

[22] Filed: May 9, 1991

[51] Int. Cl.$^5$ .................. B23B 29/02; B23C 5/26
[52] U.S. Cl. .................. 409/234; 279/83; 279/73; 408/233
[58] Field of Search .................. 409/231, 232, 234; 279/1 A, 1 TS, 83; 82/160, 158; 408/233; 51/168

[56] References Cited

U.S. PATENT DOCUMENTS

| | | | |
|---|---|---|---|
| 1,377,418 | 5/1921 | Krogh | 279/83 X |
| 1,510,282 | 9/1924 | Johnson | 279/83 |
| 2,516,709 | 7/1950 | Lustenberger et al. | 279/83 |
| 3,022,084 | 2/1962 | Dresback | 279/83 |
| 3,884,120 | 5/1975 | Diferdinando | 409/234 |
| 3,994,615 | 11/1976 | Narang | 408/233 X |
| 4,877,360 | 10/1989 | Pfalzgraf | 409/234 |
| 4,976,574 | 12/1990 | Muendlein et al. | 409/232 |

FOREIGN PATENT DOCUMENTS 2094191 9/1982 United Kingdom .

Primary Examiner—Z. R. Bilinsky
Attorney, Agent, or Firm—Learman & McCulloch

[57] ABSTRACT

Apparatus for coupling a tool holder to a machine tool spindle wherein the tool holder is fitted to a coupling interposed between the tool holder and the spindle. The coupling and the tool holder have separable fasteners for separably joining the tool holder and coupling together. The coupling can accommodate tool holders having dissimilar fasteners and the tool holder can be fitted to couplings having dissimilar fasteners.

13 Claims, 2 Drawing Sheets

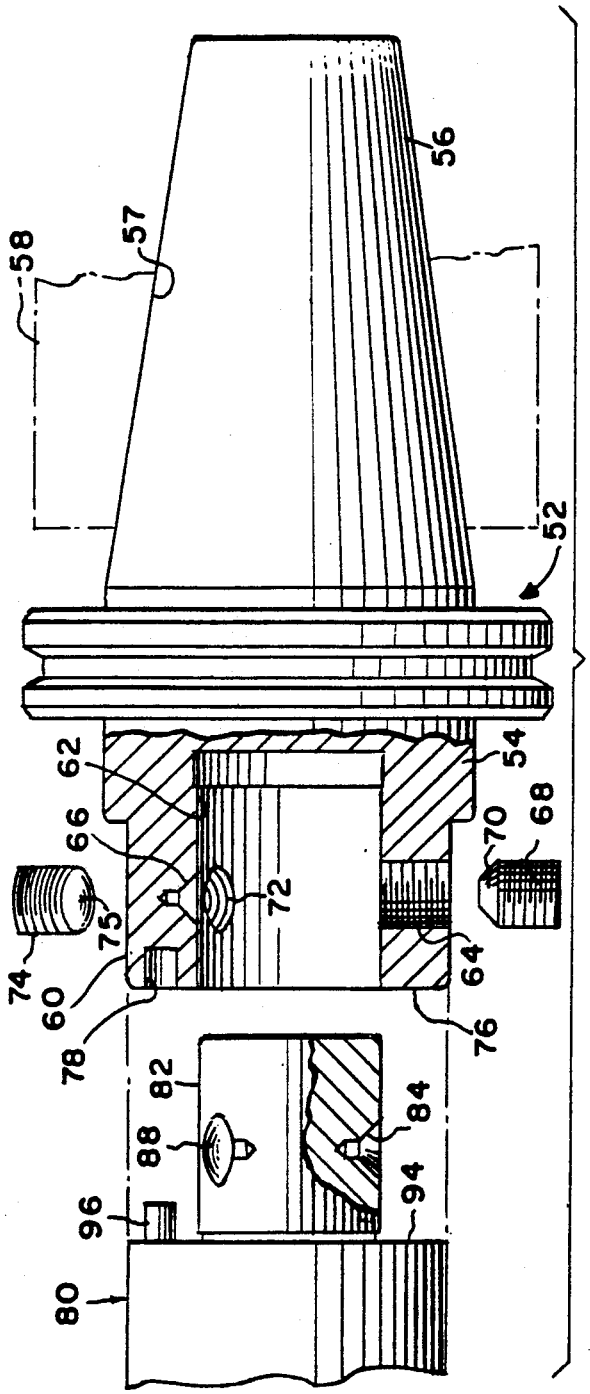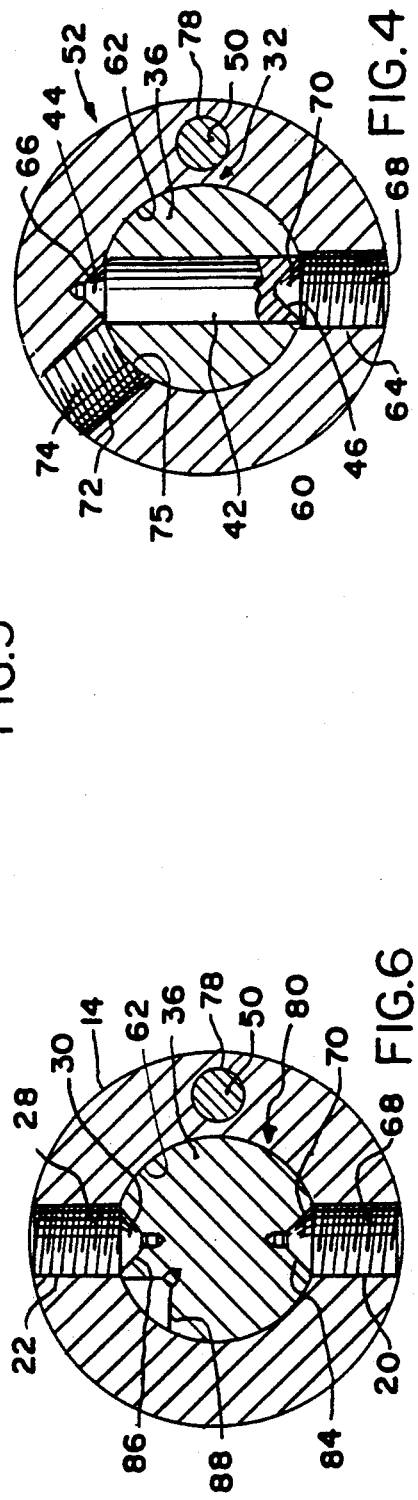

APPARATUS FOR COUPLING TOOL HOLDERS

This invention relates to apparatus for coupling a tool holder to a machine tool spindle. More specifically, the invention relates to a coupling construction adapted to connect tool holders having dissimilar coupling means to a machine tool spindle and to a tool holder construction capable of being connected to coupling devices having dissimilar coupling means.

BACKGROUND OF THE INVENTION

Tool holders and devices for coupling them to machine tool spindles are well known in the art. For example, British patent application No. 2,094,191, published Sep. 15, 1982, shows one such tool holder and coupling device. The coupling device has a socket therein for the accommodation of an extension formed on the tool holder. The extension has a transverse bore slideably accommodating a movable pin. Opposite ends of the pin are engaged by adjustable fastening screws which securely but separately fasten the tool holder to the coupling member. In such construction the coupling member is adapted to be used solely with the one type of tool holder and vice-versa. That is, the coupling member cannot be used with tool holders having coupling means different from that disclosed, and the tool holder cannot be used with coupling devices other than that disclosed. The tool holder and coupling device therein constitute a paired set.

Muendlein et al U.S. Pat. No. 4,976,574 discloses a device for coupling a tool holder to a machine tool spindle similar to that disclosed in the British patent application referred to above. Although the Muendlein et al construction is specifically different from that shown in the British publication, the coupling device again is adapted for use only with the disclosed tool holder and vice-versa.

Other examples of devices for use in coupling a tool holder to a machine tool spindle are shown in Pfalzgraf U.S. Pat. No. 4,877,360 and Dresback U.S. Pat. No. 3,022,084. Again, the coupling devices disclosed in these patents are adapted for use with the specific tool holders disclosed and vice-versa.

Although there are many kinds of tool holders and many kinds of coupling devices, none of the known coupling devices is capable of being used with tool holders having dissimilar coupling means, nor do there appear to be tool holders that can be used with coupling devices having dissimilar coupling means. Accordingly, it appears that the tool holders and coupling devices must be used in paired sets.

A principal object of the invention is to provide interchangeable coupling devices and tool holders so as to permit a particular tool holder to be used with coupling devices having dissimilar coupling means, and vice-versa, thereby avoiding the expense of having to use paired sets of tool holders and coupling devices.

SUMMARY OF THE INVENTION

Apparatus constructed according to the invention comprises a tool holder adapted for use with a number of different devices for coupling such tool holder to a machine tool spindle, and a coupling device adapted for use with a number of different tool holders.

One coupling device according to the invention has a socket for the accommodation of at least two tool holders having dissimilar coupling means, such coupling has primary fastening means for securing one of the tool holders in the coupling and secondary fastening means for securing the other tool holder in such coupling.

One tool holder according to the invention is adapted for accommodation in a socket provided in each of at least two dissimilar coupling devices having primary and secondary fasteners for use in securing the respective coupling devices to the tool holder.

The tool holders and couplings according to the invention are so constructed as to provide for interchangeability of tool holders and couplings having dissimilar coupling means.

THE DRAWINGS

FIG. 3 is an exploded view similar to FIG. 1, but showing a tool holder and spindle-coupling device constructed according to one embodiment of the invention;

FIG. 4 is a cross sectional view similar to FIG. 2 and illustrating the prior art tool holder of FIG. 1 secured to the coupling device of FIG. 3;

FIG. 6 is a cross sectional view similar to FIG. 2, but showing the prior art coupling device securing a tool holder constructed in accordance with the invention.

DETAILED DESCRIPTION

Figure 1:
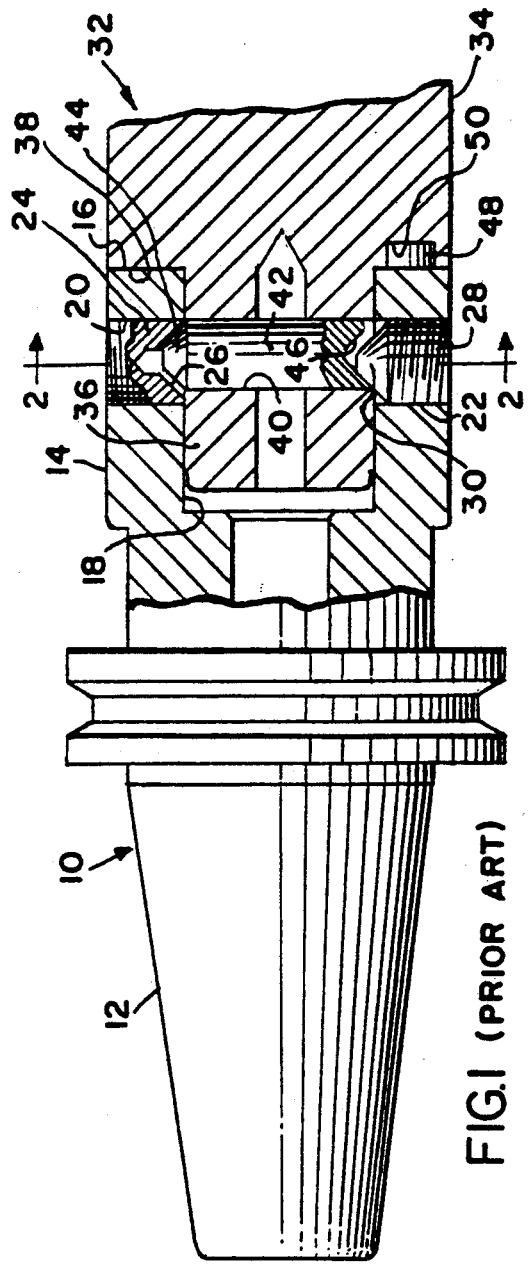
FIG. 1 is a fragmentary view partly in side elevation and partly in section of a prior art tool holder and coupling device.
Figure 2:
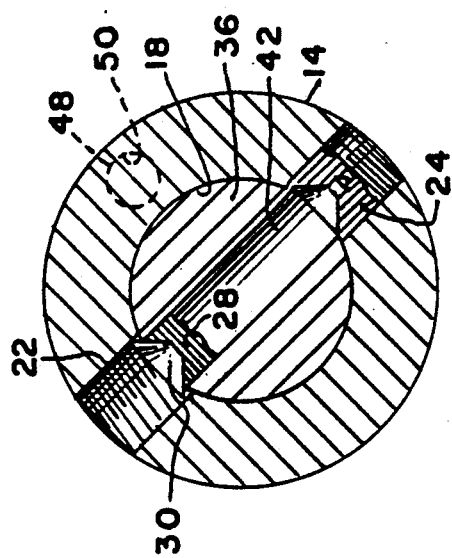
FIG. 2 is a cross sectional view taken on the line 2—2 of FIG. 1.

The apparatus disclosed in FIGS. 1 and 2 corresponds to one of the embodiments shown in the aforementioned British application and comprises a coupling member 10 terminating at one end in a tapered shank 12 and at its opposite end in an annular wall 14 having a smooth end surface 16 and defining a cylindrical socket 18. The wall 14 is provided with a pair of diametrally opposed threaded openings 20 and 22. Fitted into the opening 20 is a threaded fastening plug 24 having at its inner end a conical recess 26 and fitted into the opening 22 is a threaded fastening plug 28 terminating at its inner end in a conical projection or nose 30.

The shank 12 of the coupling member 10 is adapted to be fitted to the spindle (not shown) of a machine tool as is conventional. The coupling member also is adapted to be separately joined to a tool holder 32 comprising a body 34 having at one end a reduced diameter extension 36 of such size as snugly, but removably, to be accommodated in the socket 18 of the coupling member. The body 34 has an annular end surface 38 which confronts the surface 16 of the coupling member.

The extension 36 has a transverse bore 40 therein in which is slideably accommodated a coupling pin 42 terminating at one end in a conical nose or projection 44 confronting the conical seat 26 and terminating at its other end in an outwardly concave, conical cavity 46 confronting the conical projection 30. The overall length of the pin 42 is less than the diameter of the socket 18.

To assemble the tool holder 32 and the coupling member 10, the fastening plugs 24 and 28 are turned to positions in which neither of them projects into the socket 18, thereby enabling the extension 36, together with the pin 42, to be introduced to the socket 18 and positioned therein with the surfaces 16 and 38 engaging one another. The members 10 and 32 then may be rotated so as to align the pin 42 with the threaded openings 20 and 22, and such positioning is facilitated by a locating pin 48 projecting from the socket wall 14 for accommodation in a socket 50 in the body 34. The plugs 24 and 28 then may be rotated so as to move inwardly of their respective openings 20 and 22 and cause the conical nose 44 of the pin to seat in the conical recess 26 and the conical nose 30 to seat in the cavity 46, thereby securely anchoring the tool holder 32 to the coupling member 10.

As is best shown in FIG. 1, the longitudinal axis of the pin 42 and the axis through the conical recesses 26 and 46 are offset axially of the coupling member so that the engagement between the pin 42 and the plugs 24 and 28 causes the surfaces 16 and 38 to be drawn together.

A coupling member constructed in accordance with the invention is shown in FIGS. 3 and 4 and designated generally by the reference character 52. The coupling member comprises a body 54 terminating at one end in a tapered shank 56 adapted for removable reception in a socket 57 formed in a conventional machine tool spindle 58. The opposite end of the body terminates in an annular wall or sleeve 60 forming a socket or bore 62. The wall 60 has a radially extending, threaded opening 64 therein which communicates with the bore and, diametrally opposite the opening 64, the inner surface of the bore 62 has an outwardly concave, conical recess 66 therein which is coaxial with the opening 64 and communicates only with the bore 62. Adapted for removable accommodation in the opening 64 is a threaded fastening plug 68 terminating at its inner end in a conical nose or projection 70.

The annular wall 60 is provided with a second threaded opening 72 in communication with the bore 62 for the removable accommodation of a threaded fastening plug 74. The inner end 75 of the plug 74 is flat or concave so as to correspond to the curvature of the bore 62. The openings 64 and 72 are not coaxial, but are circumferentially spaced from one another by about 140°.

The wall 60 terminates in a flat end surface 76 in which is formed an aligning bore 78.

FIG. 4 illustrates, as an example of the versatility of the invention, the coupling member 52 coupled to the prior art tool holder 32 shown in FIGS. 1 and 2. As indicated, the conical nose 44 of the pin 42 seats in the outwardly concave recess 66 and the plug 68 has its conical nose 70 seated in the cavity 46 of the pin 42. The projection 50 on the tool holder 32 is accommodated in the socket 78 of the wall 60. As disclosed in FIG. 4, the opening 72 is occupied by the plug 74, but the plug 74 has no function other than to close the opening 72. The longitudinal axis of the pin 42 may be axially offset from the axis of the opening 64 and the conical seat 66 in the same manner as disclosed earlier.

The assembly of the coupling member 52 and the prior art tool holder 32 corresponds to the assembly of the tool holder 32 with the coupling member 10. The coupling member 52 thus is capable of accommodating the known tool holder 32, even though there are differences between the known coupling member 10 and the coupling member 52.

The coupling member 52 also is capable of accommodating tool holders having coupling means that ar dissimilar to that of the tool holder 32. One such tool holder is shown at 80 in FIGS. 3 and 5. The tool holder 80 is similar in all respects to the prior art tool holder 32 except that the tool holder 80 has at one end a reduced diameter extension 82 provided with a pair of diametrally opposed, outwardly concave conical recesses 84 and 86 instead of the bore 42. The extension 82 also has a third correspondingly shallow conical recess 88 formed therein and peripherally spaced from the recesses 84 and 86. The recesses 84, 86, and 88 are shallow; i.e., their depth is much less than the diameter of the extension 82. The axis of the recess 88 forms an angle of about 140° from the axis of the recess 84.

Figure 5:
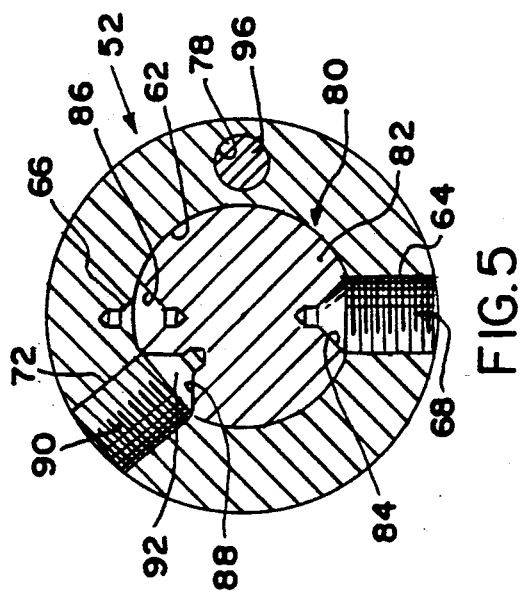
FIG. 5 is a cross sectional view similar to FIG. 4, but illustrating the tool holder and coupling device of FIG. 3.

In the embodiment shown in FIGS. 3 and 5 the fastening plug 68 has its nose 70 seated in the recess 84. A fastening plug 90, corresponding in all respects to the plug 28, occupies the opening 72 and has its nose 92 seated in the recess 88. The recesses 86 and 66 are unoccupied.

The tool holder 80 has an annular end surface 94 from which an aligning lug 96 extends for accommodation in the socket 78.

As is apparent from the foregoing the construction of the coupling member 52 is such as to enable it to be coupled to either of the two tool holders 32 and 80, notwithstanding the differences between the coupling means of the tool holders.

The tool holder 80 also is constructed in such manner as to enable it to be coupled not only to the coupling member 52, but also to other coupling members having dissimilar coupling means, one example of which is the coupling member 10.

The coupling of the tool holder 80 to the prior art coupling member 10 is illustrated in FIG. 6 wherein the extension 36 is accommodated in the socket 62 with the aligning pin 96 in the socket 78. The fastening plug 28 occupies the opening 22 and has its nose 30 seated in the recess 86. The plug 68 (or one corresponding thereto) occupies the opening 20 and has its nose 70 seated in the recess 84. The recess 88 is unoccupied.

The ability of a single coupling member to be fitted to tool holders having dissimilar coupling means and the ability of a single tool holder to be fitted to coupling members having dissimilar coupling means make possible the interchanging of tool holders and coupling members that heretofore were required to be used in paired sets only. The avoidance of having to use such paired sets enables significant economies to be realized.

The disclosed embodiment is representative of the preferred form of the invention, but is intended to be illustrative rather than definitive thereof. The invention is defined in the claims.

We claim:

1. A coupling for connecting to a machine tool spindle a selected one of a number of tool holders each of which has coupling means different from the remainder of said tool holders, said coupling comprising:
   a. a body having opposite ends;
   b. means at one end of said body for connection to said spindle;
   c. an annular wall at the opposite end of said body forming a socket having a bore open at least at one end thereof;
   d. a first opening extending radially through said wall;
   e. a concave, radial recess in said bore diametrally opposed to said first opening and in communication only with said bore;
   f. a second opening extending radially through said wall and interposed between said first opening and said recess; and g. a pair of fastening members, one of which is accommodated in said first opening and the other of which is accommodated in said second opening, and h. at least one of said fastening members being of such length as to enable one end thereof to project into said bore.

2. The coupling according to claim 1 wherein said one end of said one of said fastening members is conical.

3. The coupling according to claim 1 wherein the other of said fastening members has a concave surface confronting said bore.

4. The coupling according to claim 1 wherein one end of each of said fastening members has a conical projection movable into and out of said bore.

5. The coupling according to claim 1 wherein said second opening is spaced from said first opening by about 140°.

6. The coupling according to claim 1 wherein said selected one of said tool holders has a cylindrical extension accommodated in the bore of said socket, said extension having a transverse bore therein occupied by a slideable pin, said pin having at one end thereof a nose accommodated in said recess and having its opposite end in engagement with the fastening member in said first opening.

7. The coupling according to claim 6 wherein said opposite end of said pin has a recess therein and the fastening member in said first opening has a projection seated in said recess.

8. The coupling according to claim 1 wherein said selected one of said tool holders has a cylindrical extension accommodated in the bore said socket, said extension having a pair of recesses therein one of which confronts said first opening and the other of which confronts said second opening, the fastening members in said first and second openings being seated in the respective recesses.

9. The coupling according to claim 8 wherein each of said fastening members has a projection thereon accommodated in the respective recesses.

10. The coupling according to claim 8 wherein said extension has a third recess therein diametrally opposite said first opening.

11. A coupling for connecting to a machine tool spindle a tool holder having a cylindrical extension provided at one end thereof with a transverse bore through which slideably extends a pin terminating at one end in a projecting nose and at its opposite end in a cavity, said coupling comprising:

a. a body having opposite ends;

b. means at one end of said body for connection to said spindle;

c. an annular wall at the opposite end of said body forming a cylindrical socket accommodating said extension;

d. a first opening in said wall;

e. a recess in said wall diametrally opposite said first opening;

f. a second opening in said wall interposed between said recess and said first opening; and g. a fastening member accommodated in said first opening in engagement with said opposite end of said pin and seating the nose of said pin in said recess.

12. The coupling of claim 11 wherein said cavity is concave and said fastening plug has a projection seated in said cavity.

13. A coupling for connecting to a machine tool spindle a selected one of a number of tool holders each of which has a cylindrical extension at one end thereof, the extension of one of said holders having a transverse bore through which extends a pin terminating at one end in a projecting nose and at its other end in a cavity, the extension of another of said holders having therein first and second diametrally opposite recesses and a third recess circumferentially spaced from said first and second recesses, said coupling comprising:

a. a body having opposite ends;

b. means at one end of said body for connection to said spindle;

c. an annular wall at the opposite end of said body forming a socket having a bore for the accommodation of said extension;

d. a first opening extending radially through said wall;

e. a second opening extending radially through said wall and circumferentially spaced from said first opening, f. the circumferential spacing between said first and second openings corresponding to the circumferential spacing of said third recess from said first and second recesses;

g. a recess in said bore diametrally opposite said first opening for receiving the nose of said pin;

h. a first fastening member for reception in said first opening and accommodation in the cavity at said other end of said pin; and i. a second fastening member for reception in said second opening and accommodation in said third recess.

* * * * *